United States Patent
Liu et al.

(10) Patent No.: US 11,535,107 B2
(45) Date of Patent: Dec. 27, 2022

(54) SYSTEM AND METHOD FOR PROVIDING ASIL D FAIL OPERATIONAL POWER SYSTEMS IN AUTOMATED VEHICLE APPLICATIONS

(71) Applicant: NIO Technology (Anhui) Co., Ltd., Heifei (CN)

(72) Inventors: Xiaodong Liu, San Jose, CA (US); Bo Guo, San Jose, CA (US)

(73) Assignee: NIO Technology (Anhui) Co., Ltd., Hefei (CN)

( * ) Notice: Subject to any disclaimer, the term of this patent is extended or adjusted under 35 U.S.C. 154(b) by 0 days.

(21) Appl. No.: 17/030,976

(22) Filed: Sep. 24, 2020

(65) Prior Publication Data

US 2021/0016666 A1 Jan. 21, 2021

Related U.S. Application Data

(63) Continuation of application No. 15/705,555, filed on Sep. 15, 2017, now Pat. No. 10,800,264.

(51) Int. Cl.
*B60L 3/00* (2019.01)
*H02J 9/06* (2006.01)
(Continued)

(52) U.S. Cl.
CPC .............. *B60L 3/0092* (2013.01); *B60L 3/12* (2013.01); *G05D 1/0088* (2013.01); *H02J 9/061* (2013.01); *B60L 2210/10* (2013.01)

(58) Field of Classification Search
CPC .............................. B60L 3/0092; H02J 9/061
See application file for complete search history.

(56) References Cited

U.S. PATENT DOCUMENTS 5,244,259 A 9/1993 Pickenhahn et al.
5,796,175 A * 8/1998 Itoh ........................ H02J 9/06
307/64

(Continued)

FOREIGN PATENT DOCUMENTS

CN 205381159 U 7/2016
WO WO 2011/011088 1/2011
WO WO 2017/173420 10/2017

OTHER PUBLICATIONS

Favaro et al., Experience with ISO 26262 ASIL Decomposition, Automotive SPIN, 2011, retrieved from http://www.automotive-spin.it/uploads/8/8W_favaro.pdf, 27 pages.
(Continued)

*Primary Examiner* — Adi Amrany
(74) *Attorney, Agent, or Firm* — Sheridan Ross P.C.

(57) ABSTRACT

A vehicle control unit (e.g., a control unit for an automobile) receives feedback from an intelligent voltage/current sensor and a DC/DC controller. The DC/DC controller comprises a first switch for controlling power from a primary power source (e.g., low voltage power supplied from a high voltage battery). The intelligent voltage/current sensor senses power output from the primary power source. The vehicle control unit processes feedback from the intelligent voltage/current sensor and/or the DC/DC controller to determine if a failure has occurred in the primary power source. In response to determining the failure in the primary power source, the vehicle control unit disables the power from the primary power source using a second switch (e.g., a switch in a relay).

20 Claims, 5 Drawing Sheets

(51) Int. Cl.
*B60L 3/12* (2006.01)
*G05D 1/00* (2006.01)

(56) References Cited

U.S. PATENT DOCUMENTS

| | | | |
|---|---|---|---|
| 6,583,603 | B1 | 6/2003 | Baldwin |
| 8,527,139 | B1 | 9/2013 | Yousuf |
| 8,944,865 | B1 | 2/2015 | Krabacher et al. |
| 9,547,307 | B1 | 1/2017 | Cullinane et al. |
| 9,802,638 | B1 | 10/2017 | Stoffel et al. |
| 9,897,642 | B1 | 2/2018 | Johnson |
| 10,274,532 | B1 | 4/2019 | Smith et al. |
| 10,466,061 | B2 | 11/2019 | Newman |
| 2002/0070608 | A1* | 6/2002 | Matsuki ............... B23K 31/02 307/9.1 |
| 2008/0234897 | A1 | 9/2008 | Tsuchida |
| 2009/0127399 | A1* | 5/2009 | Mueller ................ B64G 1/62 244/159.1 |
| 2009/0212634 | A1 | 8/2009 | Kojima et al. |
| 2010/0117585 | A1 | 5/2010 | Fitch et al. |
| 2011/0043152 | A1 | 2/2011 | Kidokoro et al. |
| 2012/0056478 | A1 | 3/2012 | Omoto et al. |
| 2012/0316729 | A1 | 12/2012 | Kim |
| 2012/0330501 | A1 | 12/2012 | Sundaram et al. |
| 2013/0105264 | A1 | 5/2013 | Ruth et al. |
| 2013/0268798 | A1 | 10/2013 | Schade et al. |
| 2014/0091619 | A1 | 4/2014 | Yoshimi |
| 2014/0139150 | A1 | 5/2014 | Morisaki |
| 2014/0375116 | A1 | 12/2014 | Deneszczuk et al. |
| 2015/0054470 | A1 | 2/2015 | Peuchant et al. |
| 2015/0229080 | A1 | 8/2015 | Degen |
| 2015/0288169 | A1 | 10/2015 | Schinzel |
| 2015/0338849 | A1 | 11/2015 | Nemec et al. |
| 2016/0026205 | A1 | 1/2016 | Song et al. |
| 2016/0096438 | A1 | 4/2016 | Grimes et al. |
| 2016/0229298 | A1 | 8/2016 | Chen et al. |
| 2017/0057510 | A1 | 3/2017 | Herbach |
| 2017/0136913 | A1* | 5/2017 | Yang ..................... B60L 58/14 |
| 2018/0138816 | A1 | 5/2018 | Katrak |
| 2018/0208064 | A1 | 7/2018 | Wortberg et al. |
| 2018/0294641 | A1 | 10/2018 | Strouse et al. |
| 2019/0039457 | A1 | 2/2019 | Katrak |
| 2019/0084425 | A1 | 3/2019 | Liu et al. |
| 2019/0100105 | A1 | 4/2019 | Liu et al. |
| 2019/0337403 | A1 | 11/2019 | Tanaka |

OTHER PUBLICATIONS

Blackburn, Case Study of an ASIL D Torque Vectored Electric Power Train Aligned to ISO 26262, Zytek Automotive, 2013, retrieved from http://aesin.org.uk/wp-content/uploads/2013/07/ZYTEK-AESIN-Presentation-24th_Sept_13-DB.pdf, 22 pages.
International Search Report and Written Opinion for International (PCT) Patent Application No. PCT/US18/49887, dated Nov. 1, 2018 9 pages.
International Preliminary Report on Patentability for International (PCT) Patent Application No. PCT/US18/49887, dated Mar. 26, 2020 8 pages.
Official Action for U.S. Appl. No. 15/395,745, dated Sep. 28, 2018 6 pages, Restriction Requirement.
Official Action for U.S. Appl. No. 15/395,745, dated Dec. 19, 2018 7 pages.
Notice of Allowance for U.S. Appl. No. 15/395,745, dated Jun. 26, 2019 7 pages.
Official Action for U.S. Appl. No. 15/725,119, dated Jan. 3, 2020 7 pages.
Official Action for U.S. Appl. No. 15/725,119, dated Apr. 2, 2020 12 pages.
Notice of Allowance for U.S. Appl. No. 15/725,119, dated Jul. 23, 2020 7 pages.
Notice of Allowance for U.S. Appl. No. 15/797,506, dated Nov. 29, 2018 8 pages.
Official Action for U.S. Appl. No. 15/705,555, dated Apr. 12, 2019 6 pages, Restriction Requirement.
Official Action for U.S. Appl. No. 15/705,555, dated Jun. 26, 2019 10 pages.
Final Action for U.S. Appl. No. 15/705,555, dated Oct. 24, 2019 15 pages.
Official Action for U.S. Appl. No. 15/705,555, dated Feb. 19, 2020 12 pages.
Notice of Allowance for U.S. Appl. No. 15/705,555, dated Jun. 4, 2020 10 pages.
Corrected Notice of Allowance for U.S. Appl. No. 15/705,555, dated Jul. 27, 2020 2 pages.
U.S. Appl. No. 15/395,745, filed Dec. 30, 2016.
U.S. Appl. No. 15/725,119, filed Oct. 4, 2017.
U.S. Appl. No. 15/797,506, filed Oct. 30, 2017.
U.S. Appl. No. 15/705,555, filed Sep. 15, 2017.

* cited by examiner

SYSTEM AND METHOD FOR PROVIDING ASIL D FAIL OPERATIONAL POWER SYSTEMS IN AUTOMATED VEHICLE APPLICATIONS

CROSS-REFERENCE TO RELATED APPLICATIONS

The present application is a continuation of and claims the benefits of and priority to U.S. patent application Ser. No. 15/705,555, filed on Sep. 15, 2017, of the same title, the entire disclosure of which is hereby incorporated by reference, in its entirety, for all that it teaches and for all purposes.

FIELD

The present disclosure is generally related to vehicle systems and in particular to fail operational power systems for automated vehicle applications.

BACKGROUND

With the advent of electric vehicles, high voltage batteries (e.g., 400 volt battery packs) are used as the primary power source for providing power to the electric vehicle; high voltage batteries also support low voltage power networks for the entire vehicle Electrical and/or Electronic (E/E) systems via Direct Current to Direct Current (DC/DC) systems, i.e. 400 volts-to-12 volts. In automated vehicle applications, the loads on the low voltage power network normally include safety critical systems such as autonomy sensors, (i.e., ultrasonic, camera, radar, lidar etc.) autonomy computing systems, battery management systems, vehicle controllers, steering systems, brake systems, vehicle state sensors, propulsion systems etc. Failure of the low voltage power network may potentially lead to loss of control of the vehicle, resulting in accidents, or even loss of life. Therefore, for automated vehicle applications, DC/DC systems which supports low voltage power networks are required to be fail operational via either redundant DC/DC converters or have a DC/DC converter as the primary support for the low voltage power network, and have a low voltage battery as a backup in case of a DC/DC converter failure.

A failure of DC/DC converter may potentially bring down the low voltage power network or damage the low voltage power network by providing too high or too low voltage; therefore, detection of a DC/DC system malfunction/failure becomes increasingly important, especially for automated vehicle applications.

DETAILED DESCRIPTION

Embodiments of the present disclosure will be described in connection with an automated vehicle, and in some embodiments, an electric automated vehicle, a rechargeable electric automated vehicle, and/or a hybrid-electric automated vehicle and associated systems.

Figure 1:
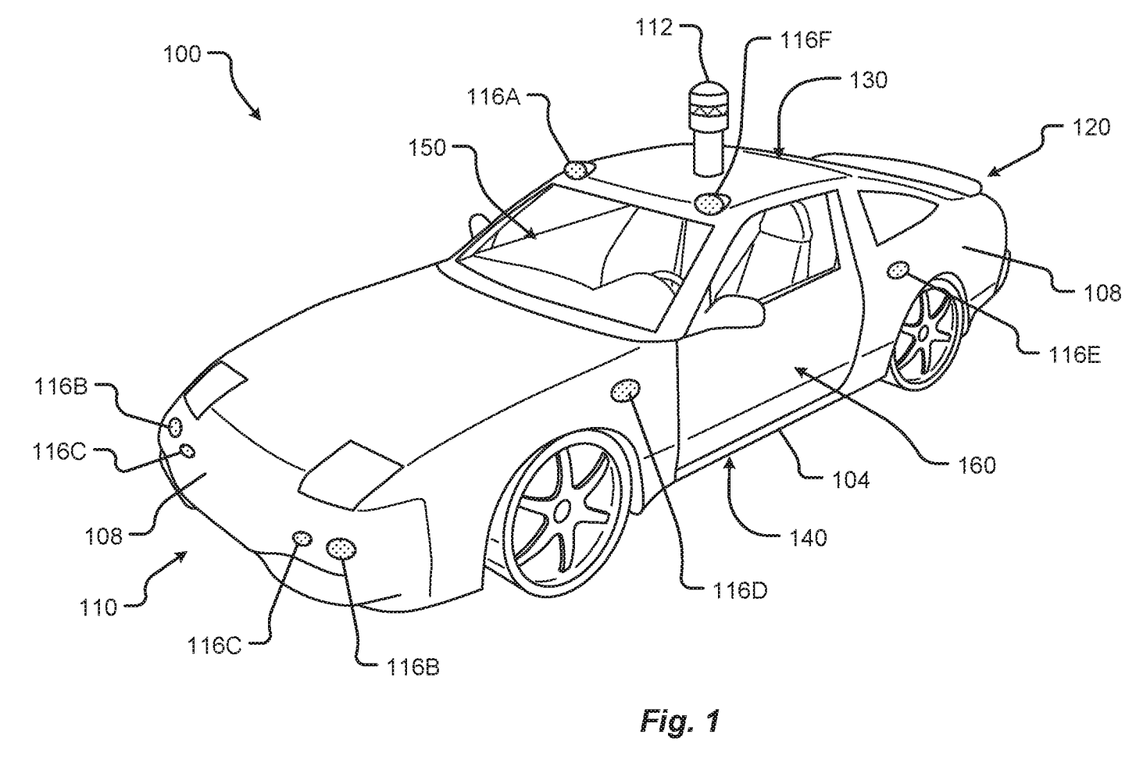
FIG. 1 shows an automated vehicle in accordance with embodiments of the present disclosure.

FIG. 1 shows a perspective view of an automated vehicle 100 in accordance with embodiments of the present disclosure. The electric automated vehicle 100 comprises an automated vehicle front 110, an automated vehicle aft or rear 120, an automated vehicle roof 130, at least one automated vehicle side 160, an automated vehicle undercarriage 140, and an automated vehicle interior 150. In any event, the automated vehicle 100 may include a frame 104 and one or more body panels 108 mounted or affixed thereto. The automated vehicle 100 may include one or more interior components (e.g., components inside an interior space 150, or user space, of an automated vehicle 100, etc.), exterior components (e.g., components outside of the interior space 150, or user space, of an automated vehicle 100, etc.), drive systems, controls systems, structural components, and/or the like.

Although shown in the form of a car, it should be appreciated that the automated vehicle 100 described herein may include any conveyance or model of a conveyance, where the conveyance was designed for the purpose of moving one or more tangible objects, such as people, animals, cargo, and the like. The term "automated vehicle" 100 does not require that a conveyance moves or is capable of movement. Typical automated vehicles may include but are in no way limited to cars, trucks, motorcycles, busses, automobiles, trains, railed conveyances, boats, ships, marine conveyances, submarine conveyances, airplanes, space craft, flying machines, human-powered conveyances, drones, and/or the like.

In some embodiments, the automated vehicle 100 may include a number of sensors, devices, and/or systems that are capable of assisting in driving operations, e.g., autonomous or semi-autonomous control. These systems typically receive power from a low voltage network (e.g., a 12-volt network). For example, these systems may receive power from a DC/DC converter that provides power to the low voltage network from a vehicle battery pack. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, object-detecting sensors, driver control sensors (e.g., turn signal sensors, light control sensors, wiper control sensors, wiper fluid sensors, seat adjustment sensors, and radio control sensors), fuel sensors, coolant sensors, temperature sensors, whether sensors, road ice detectors, wet road detectors, road sign detectors, occupancy detectors, brake sensors, steering wheel sensors, cruise control sensors, and/or the like. The sensors may be disposed in an interior space 150 of the automated vehicle 100 and/or on an outside of the automated vehicle 100. In some embodiments, the sensors and systems may be disposed in one or more portions of an automated vehicle 100 (e.g., the frame 104, a body panel 108, a compartment, etc.).

The automated vehicle sensors and systems may be selected and/or configured to suit a level of operation associated with the automated vehicle 100. Among other things, the number of sensors used in a system may be altered to increase or decrease information available to an automated vehicle control system (e.g., affecting control capabilities of the automated vehicle 100). Additionally or alternatively, the sensors and systems may be part of one or more advanced driver assistance systems (ADAS) associated with an automated vehicle 100. In any event, the sensors and systems may be used to provide driving assistance at any level of operation (e.g., from fully-manual to fully-autonomous operations, etc.) as described herein.

The various levels of automated vehicle control and/or operation can be described as corresponding to a level of autonomy associated with an automated vehicle 100 for automated vehicle driving operations. For instance, at Level 0, or fully-manual driving operations, a driver (e.g., a human driver) may be responsible for all the driving control operations (e.g., steering, accelerating, braking, etc.) associated with the automated vehicle. Level 0 may be referred to as a "No Automation" level. At Level 1, the automated vehicle 100 may be responsible for a limited number of the driving operations associated with the automated vehicle 100, while the driver is still responsible for most driving control operations. An example of a Level 1 automated vehicle may include an automated vehicle in which the throttle control and/or braking operations may be controlled by the automated vehicle 100 (e.g., cruise control operations, etc.). Level 1 may be referred to as a "Driver Assistance" level. At Level 2, the automated vehicle 100 may collect information (e.g., via one or more driving assistance systems, sensors, etc.) about an environment of the automated vehicle (e.g., surrounding area, roadway, traffic, ambient conditions, etc.) and use the collected information to control driving operations (e.g., steering, accelerating, braking, etc.) associated with the automated vehicle 100. In a Level 2 autonomous automated vehicle 100, the driver may be required to perform other aspects of driving operations not controlled by the automated vehicle. Level 2 may be referred to as a "Partial Automation" level. It should be appreciated that Levels 0-2 all involve the driver monitoring the driving operations of the automated vehicle 100.

At Level 3, the driver may be separated from controlling all the driving operations of the automated vehicle 100 except when the automated vehicle 100 makes a request for the operator to act or intervene in controlling one or more driving operations. In other words, the driver may be separated from controlling the automated vehicle 100 unless the driver is required to take over for the automated vehicle. Level 3 may be referred to as a "Conditional Automation" level. At Level 4, the driver may be separated from controlling all the driving operations of the automated vehicle 100 and the automated vehicle 100 may control driving operations even when a user fails to respond to a request to intervene. Level 4 may be referred to as a "High Automation" level. At Level 5, the automated vehicle can control all the driving operations associated with the automated vehicle 100 in all driving modes. The automated vehicle 100 in Level 5 may continually monitor traffic, vehicular, roadway, and/or environmental conditions while driving the automated vehicle 100. In Level 5, there is no human driver interaction required in any driving mode. Accordingly, Level 5 may be referred to as a "Full Automation" level. It should be appreciated that in Levels 3-5 the automated vehicle 100, and/or one or more automated driving systems associated with the automated vehicle 100, monitors the driving operations of the automated vehicle and the driving environment.

As shown in FIG. 1, the automated vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the automated vehicle 100. In one embodiment, the RADAR sensors 116B may be disposed at least at a front 110, aft 120, or side 160 of the automated vehicle 100. Among other things, the RADAR sensors may be used to monitor and/or detect a position of other automated vehicles 100, pedestrians, and/or other objects near, or proximal to, the automated vehicle 100. While shown associated with one or more areas of an automated vehicle 100, it should be appreciated that any of the sensors and systems 116A-K, 112 illustrated in FIG. 1 may be disposed in, on, and/or about the automated vehicle 100 in any position, area, and/or zone of the automated vehicle 100.

Figure 2:
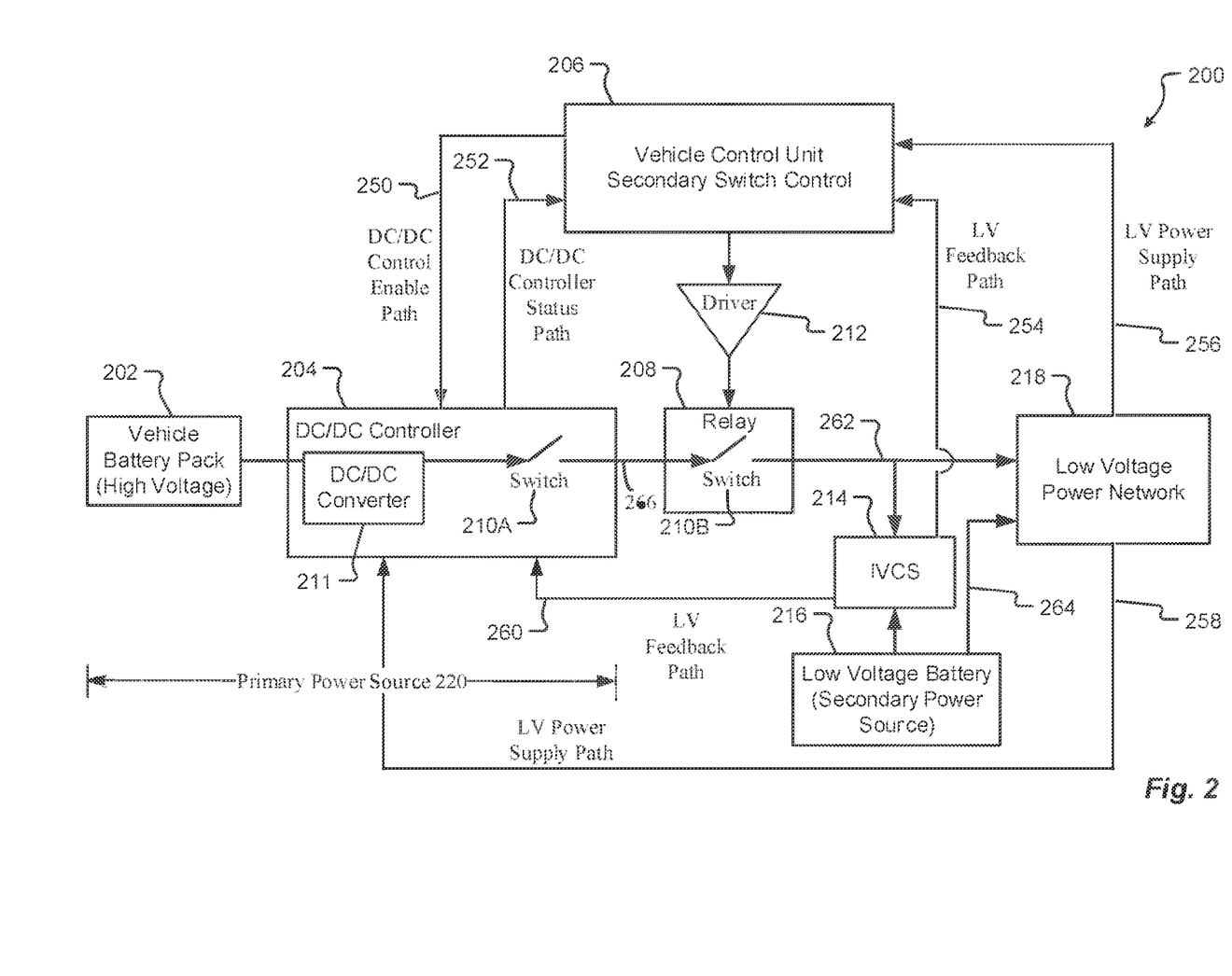
FIG. 2 is a block diagram of a first illustrative system with Automotive Safety Integrity level (ASIL) decomposition in Vehicle Control Unit (VCU) for providing a fail operational low voltage power network in an automated vehicle.

FIG. 2 is a block diagram of a first illustrative system 200 for providing a fail operational low voltage power network 218 in an automated vehicle 100. The first illustrative system 200 comprises a vehicle battery pack 202, a DC/DC controller 204, a vehicle control unit (VCU) 206, a relay 208, a driver 212, an intelligent voltage/current sensor (IVCS) 214, a low voltage battery 216, and a low voltage network 218. In FIG. 2, the combination of the vehicle battery pack 202 and the DC/DC controller 204 comprise a primary power source 220 for the low voltage power network 218. In addition, FIG. 2 also comprises a DC/DC control enable path 250, a DC/DC controller status path 252, a Low Voltage (LV) feedback path 254 from the IVCS 214, a LV power supply path 256 to the VCU 206, a LV power supply path 258 to the DC/DC controller 204, a LV feedback path 260 from the IVCS 214 to the DC/DC controller 204, a primary low voltage power path 262, a secondary low voltage power path 264 via LV battery 216, and a primary power source output path 266 from the DC/DC controller 204.

The vehicle battery pack 202 is a high voltage battery pack (e.g., 400 volts) that is used to power an automated electric vehicle 100. Examples of the vehicle battery pack 202 may include led-acid batteries, nickel metal hydride batteries, lithium-ion batteries, and/or the like. The vehicle battery pack 202 is typically used to provide propulsion to the automated vehicle 100.

The low voltage battery 216 is a battery that can be used to provide power to the low voltage network 218. For example, the low voltage battery 216 may be a 12-volt battery that provides a secondary source of power to the low voltage network 218 via the secondary low voltage power path 264. In one embodiment, the low voltage battery 216 is charged by the primary power source 220 via the primary low voltage power path 262.

The IVCS 214 is a voltage/current sensor system that can sense different information about the low voltage battery 216 and/or the primary power source 220. For example, the IVCS 214 may sense voltage and/or amperage information regarding the primary power source 220 and/or the low voltage battery 216. In one embodiment, the IVCS 214 may comprise a microprocessor.

The low voltage network 218, as discussed above, provides low voltage power for electronics of the automated vehicle 100, such as, electronics that control steering, breaking, automotive monitoring, heating/air systems, and/or the like. In FIG. 2, the low voltage power network 218 may receive power from the primary power source 220 and/or the low voltage battery 216 (a secondary power source). The low voltage network 218 redundantly provides low voltage power to the DC/DC controller 204 and the vehicle control unit 206 via the low voltage power network 218 (via the LV power supply paths 256 and 258). Although not shown, the low voltage power network 218 also provides power for the IVCS 214 and the driver 212.

The relay 208 is device that includes a controllable switch 210B. By sending power through a coil (e.g., from driver 212), the switch 210B may be turned on and off. In one embodiment, the relay 208/switch 210B may be a solid-state relay that does not need the driver 212.

The driver 212 may be any electronic device that can take an input signal and provide power for controlling the relay 208. The driver 212 provides the additional power necessary to drive the coil in the relay 208 to turn switch 210B on and off.

The vehicle control unit 206 determines whether the primary power source 220 is working properly. The vehicle control unit 206, based on feedback information, controls the relay 208 so that power from the primary power source 220 may be redundantly switched on or off directly by the vehicle control unit 206. The vehicle control unit 206 may also provide different instructions to the DC/DC controller 204 for controlling functions of the DC/DC controller 204. In one embodiment, the vehicle control unit 206 may comprise a microprocessor and memory. In one embodiment, the vehicle control unit 206 is designed according to Automotive Safety Integrity Level B.

The DC/DC controller 204 further comprises a DC/DC converter 211 and a switch 210A. Although not shown, the DC/DC controller 204 may comprise a microprocessor and memory. In one embodiment, the DC/DC controller 204 is designed according to Automotive Safety Integrity Level (ASIL) B. The DC/DC converter 211 converts the high voltage (e.g., 400 volts) from the vehicle battery pack 202 to supply low voltage power (e.g., 12 volts) to the low voltage power network 218. The switch 210A switches power on and off from the output of the DC/DC converter 211 to the low voltage network 218. The switch 210A may be an electronic switch or a mechanical switch. For example, the switch 210A may be a solid-state relay or a mechanical switch that is part of a mechanical relay. The switch 210A is used by the DC/DC controller 204 to enable/disable power supplied by the primary power source 220 to the low voltage network 218. For example, the DC/DC controller 204 may sense that the output from the DC/DC converter 211 is too low (e.g., has fallen below 10 volts) and cause the switch 210A to switch off (thus triggering the low voltage network to switch to the low voltage battery 216 using the secondary low voltage power path 264). In FIG. 2 (and FIGS. 3-4), the switch 210A and the switch 210B in the relay 208 are configured so that they are back-to-back switches 210A-210B. This way both switches 210A-210B can be used to switch the power from the primary power source 220 on and off.

The DC/DC controller 204 may receive an instruction (i.e., commands) from the vehicle control unit 206 (a secondary switch control) via DC/DC control enable path 250. The instruction may be in the form of one or more commands to enable the switch 210A (turn on the low voltage power from the output of the DC/DC converter 211) or to disable the switch 210A (turn off the low voltage power from the output of the DC/DC converter 211). The command may also be to turn on or off the DC/DC converter 211.

Alternatively, the feedback from IVCS may be in the form of information that is processed by the DC/DC controller 204 (i.e., processed by a microprocessor). The feedback from the IVCS via LV feedback path 260 may be that the IVCS 214 has detected an improper voltage and/or amperage (at the primary low voltage power path 262) provided by the DC/DC converter 211. For example, the output at the primary low voltage power path 262 may be that only 8 volts are being provided where 12 volts is expected. The IVCS 214 sends this information, via LV feedback path 254, to the vehicle control unit 206. The vehicle control unit 206 may use the information to disable power (turn off switch 210B).

The DC/DC controller 204 may also receive feedback directly from the IVCS 214 via LV feedback path 260. For example, the IVCS 214 may indicate that the amperage being drawn at the primary low voltage power path 262 is exceeding or dropping below a threshold. The DC/DC controller 204 may then turn off the switch 210A.

Having both direct and indirect feedback from the IVCS 214 via LV feedback paths 254 and 260 provides extra redundancy. For example, if the LV feedback path 260 fails, the LV feedback path 254 can still be used to indicate a problem at the primary low voltage power path 262 (e.g., an improper voltage). Alternatively, if the LV feedback path 254 fails, the DC/DC controller 204 can receive the status from the IVCS 214 (received via LV feedback path 260).

The DC/DC controller 204 provides status information to the vehicle control unit 206 via the DC/DC controller status path 252. The status provided by the DC/DC controller 204 to the vehicle control unit 206 may include information about a status of the DC/DC converter 211 (voltage/amperage statics), a status of the switch 210A (e.g., on or off), a status of the IVCS 214, (via LV feedback path 260 to provide redundancy if LV path 254 fails), and/or the like. The information may comprise historical information. The historical information may comprise samples over a time period, such as samples at the primary low voltage power path 262 by the IVCS 214, voltage/amperage samples at the DC/DC converter 211 (e.g., at the input and/or output of the DC/DC converter 211), samples of whether the switch 210A is working or not working properly, and/or the like. The information may comprise information about the vehicle battery pack 202, such as voltage, amperage, and temperature information.

The vehicle control unit 206 takes the feedback information provided by the LV feedback path 254 and/or the DC/DC controller status path 252 to determine if the power provided from the primary power source 220 has failed. A power failure may be based on a voltage range/level, an amperage range/level, a temperature of a battery, a status of a switch 210, a temperature of a device (e.g., the DC/DC controller 204), an over voltage, an under voltage, an over amperage, an under amperage, a power level, a loss of communication on a path (e.g., the PSC status path 252 and/or the DC/DC control enable path 250), a combination of these, and the like.

A failure of the primary power source 220 may indicate that the power output from the DC/DC controller 204 is above or below a voltage or amperage level. For example, the output from the DC/DC controller 204 at the primary low voltage power path 262 (assuming switch 210B is on) may be at 14 volts (which is above a threshold of 13 volts). In this case, the DC/DC converter 211 is not working properly and the IVCS 214 provides this feedback information directly to the vehicle control unit 206 via LV feedback path 254 (or alternatively indirectly from the DC/DC controller 204 that received the status from the IVCS 214 via LV feedback path 260).

In one embodiment, the DC/DC controller 204 may notify the vehicle control unit 206 that it is aware of a voltage and/or amperage failure, but is unable to turn off switch 210A. In this example, the vehicle control unit 206 may be also notified of the problem from the IVCS 214 (via LV feedback path 254) where the IVCS 214 also detects the voltage and/or amperage failure. The vehicle control unit 206 then uses the information from the DC/DC controller 204 and/or the IVCS 214 to determine the specific type of failure of the primary power source 220.

In response to determining the failure of the primary power source 220, the vehicle control unit 206 provides a signal to the driver 212 to disable power from the primary power source 220. The driver 212 activates the relay 208 to cause switch 210B to turn off power from the primary power source 220. When this occurs, the low voltage power network 218 switches to use power from the low voltage battery 216 (a secondary power source) via the secondary low voltage power path 264.

Alternatively, (e.g., at a later point in time) the vehicle control unit 206 may receive feedback from the IVCS 214 and/or the DC/DC controller 204 that the power from the primary power source 220 is now within a defined level (e.g., in a range of 11.5 volts to 12.5 volts). At this point, the vehicle control unit 206 provides a signal that switches the relay 208 (switch 210B) on. The vehicle control unit 206 may also send a signal to the DC/DC controller 204, via DC/DC control enable path 250, to turn switch 210A on if it is not already switched on.

Figure 3:
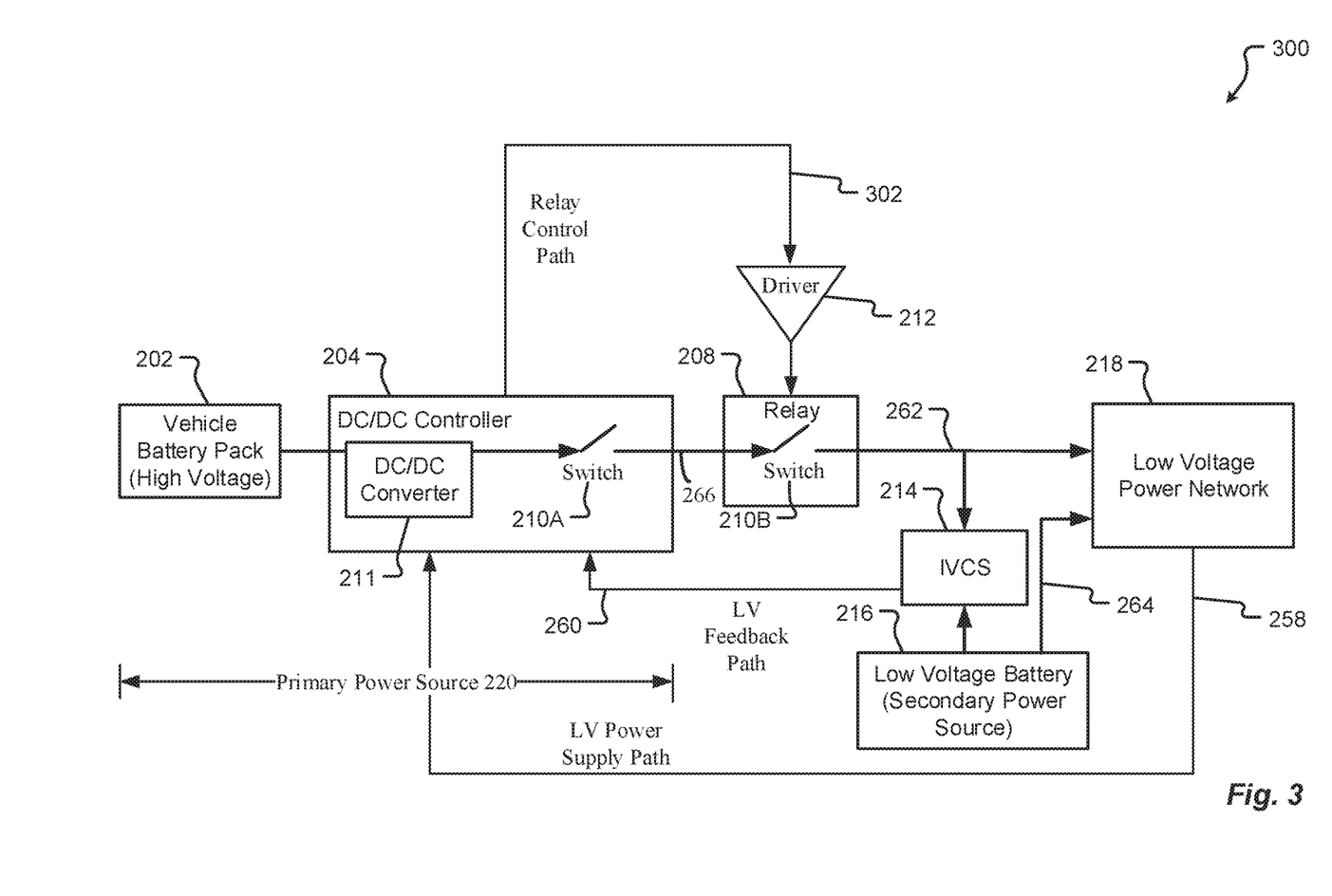
FIG. 3 is a block diagram of a second illustrative system with ASIL D for providing a fail operational low voltage power network in an automated vehicle.

FIG. 3 is a block diagram of a second illustrative system 300 for providing a fail operational low voltage power network 218 in an automated vehicle 100. In FIG. 3, the primary difference from FIG. 2 is that the vehicle control unit 206 has been removed along with the DC/DC control enable path 250, the DC/DC controller status path 252, the LV feedback path 254, and the LV power supply path 256.

In FIG. 3, the IVCS 214 monitors power at the low voltage battery 216 and from the primary power source 220. In FIG. 3, the DC/DC controller 204 receives direct feedback from the IVCS 214, via LV feedback path 260, in a similar manner as discussed in FIG. 2. The DC/DC controller 204 determines that the primary power source 220 has failed based on the feedback from the IVCS 214. In response to the failure of the primary power source 220, the DC/DC controller 204 provides a signal, via relay control path 302 to the driver 212, to switch off the switch 210B in the relay 208. This results in power being disabled from the primary power source 220 to the low voltage network 218.

For example, if the IVCS 214 determines that the voltage at the primary low voltage power path 262 is over a threshold (e.g., over 13 volts), the IVCS 214 provides feedback via the LV feedback path 260 to the DC/DC controller 204. The DC/DC controller 204 can disable the output from the primary power source 220 by sending a signal, via relay control path 302, to turn off the switch 210B in the relay 208. This may also be based on the switch 210A being stuck in the on position. This provides redundancy when the switch 210A fails.

Figure 4:
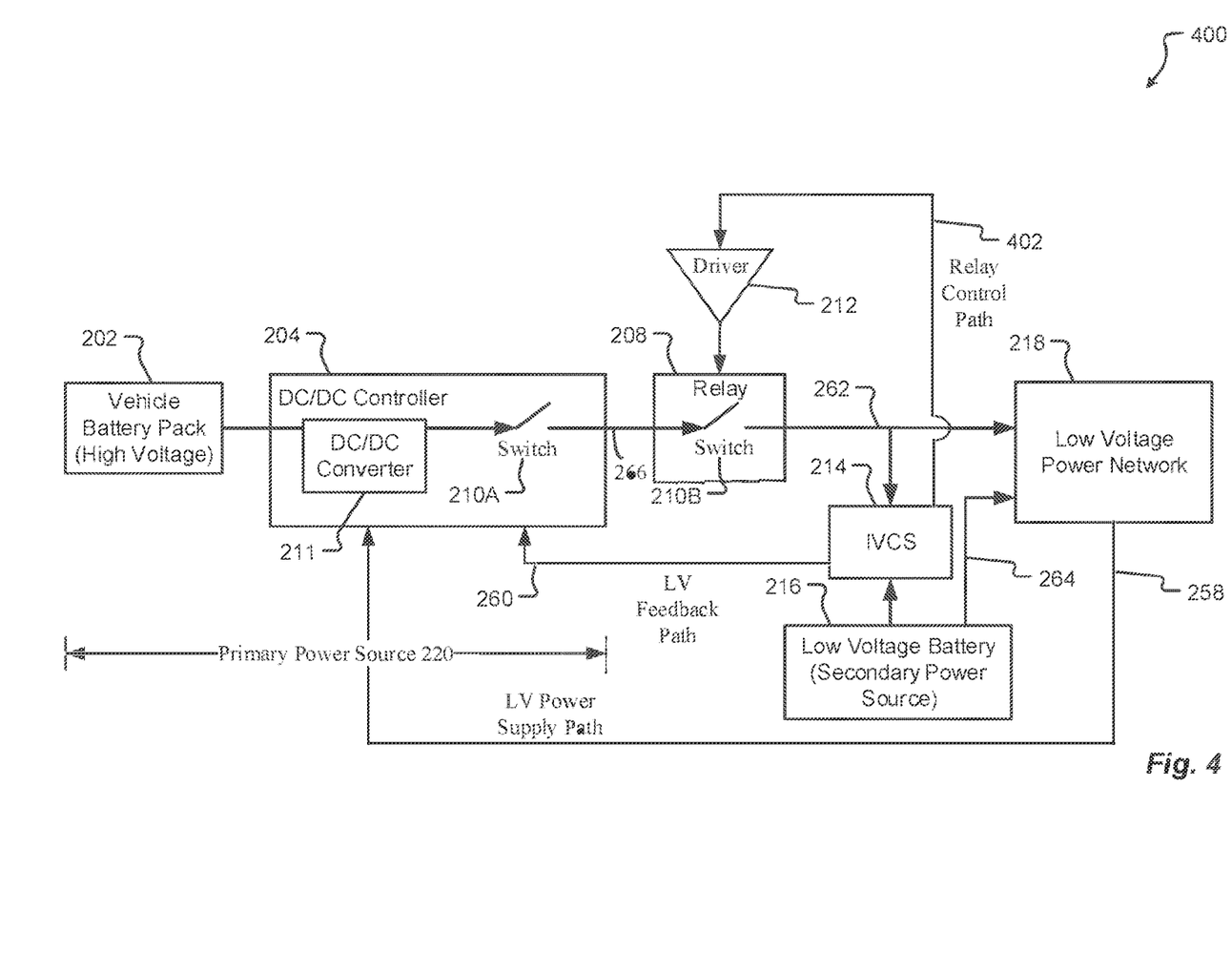
FIG. 4 is a block diagram of a third illustrative system with ASIL decomposition in Intelligent Voltage/Current Sensor (IVCS) for providing a fail operational low voltage power network in an automated vehicle.

FIG. 4 is a block diagram of a third illustrative system 400 for providing a fail operational low voltage power network 218 in an automated vehicle 100. In FIG. 4, like in FIG. 3, the vehicle control unit 206 has been removed along with the DC/DC control enable path 250, the DC/DC controller status path 252, the LV feedback path 254, and the LV power supply path 256. The DC/DC controller 204 receives feedback from the IVCS 214, via LV feedback path 260, in a similar manner as discussed in FIG. 2. The feedback is used to control switch 210A. In FIG. 4, the IVCS 214 monitors power at the low voltage battery 216, and at the primary power source 220 via the low voltage power path 262. The IVCS 214 determines that the primary power source 220 has failed. For example, the IVCS 214 may determine that the primary power source 220 has failed based on the voltage level at the primary low voltage power path 262 being over a threshold (e.g., over 13 volts). In response to determining the primary power source 220 has failed, the IVCS 214 provides a signal, via relay control path 402 and driver 212, to switch the switch 210B off in the relay 208.

Figure 5:
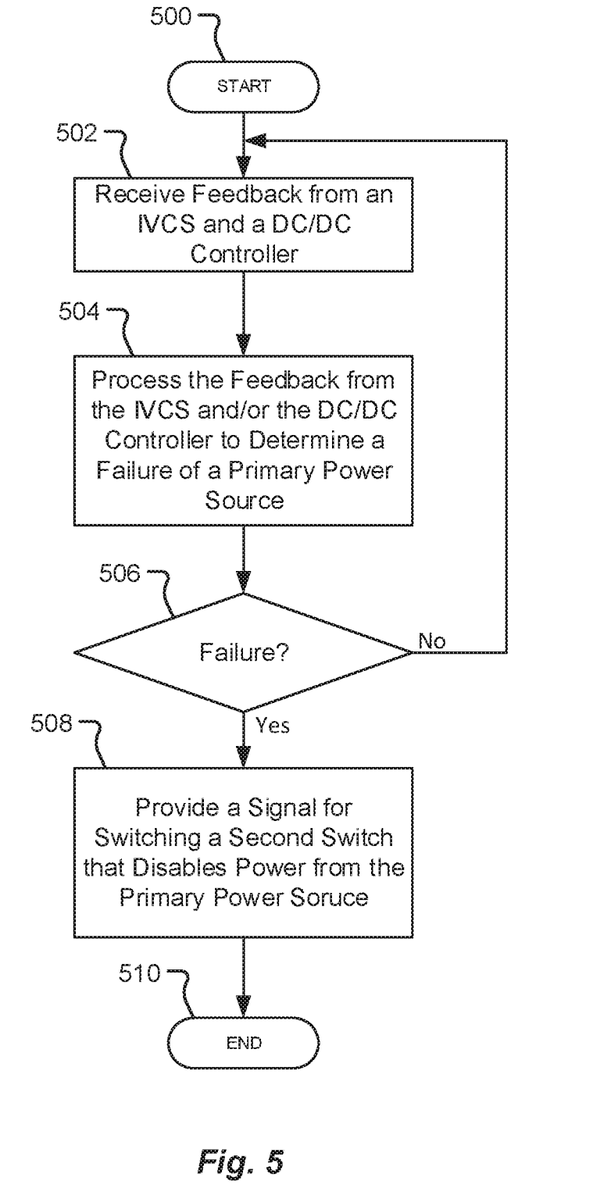
FIG. 5 is a flow diagram of a method for providing fail operational power in accordance with embodiments of the present disclosure.

FIG. 5 is a flow diagram of a method for providing fail operational power in accordance with embodiments of the present disclosure. The process starts in step 500. An electronic circuit (e.g., a microprocessor) in the vehicle control unit 206 receives feedback from the IVCS 214 and the DC/DC controller 204 step 502. For example, the feedback may indicate an identified voltage, an identified amperage, an identified temperature, and/or the like. The DC/DC controller has a first switch 210A that controls the primary power source 220.

The electronic circuit processes the feedback from the IVCS 214 and/or the DC/DC controller 204 to determine if a failure of the primary power source 220 has occurred in step 504. For example, as discussed above, the failure may be an over voltage. If the failure has not occurred in step 506, the process goes back to step 502. Otherwise, if a failure has occurred in step 506, the electronic circuit provides a signal for switching a second switch 210B that disables power from the primary source 220 in step 508. The process then ends in step 510.

In one embodiment, the feedback to determine the failure in step 504 is based on feedback from the IVCS 214. The IVCS 214 monitors power at the low voltage battery 214 and from the output of the DC/DC controller 204.

In another embodiment, the feedback to determine the failure in step 504 is based on feedback from the DC/DC controller 204. The feedback from the DC/DC controller 204 may indicate that the DC/DC controller 204 has failed and that the switch 210A is locked to constantly provide power from the primary power source 220.

In one embodiment, the feedback is based on feedback from both the DC/DC controller 204 and the IVCS 214. For example, both the DC/DC controller 204 and the IVCS 214 may indicate an improper voltage from the primary power source 220.

The exemplary systems and methods of this disclosure have been described in relation to automated vehicle systems and electric automated vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a system for providing fail operational power comprising: a vehicle control unit that receives feedback from an intelligent voltage/current sensor and a DC/DC controller, wherein the DC/DC controller comprises a first switch for controlling power from a primary power source, processes the feedback from the intelligent voltage/current sensor and/or the DC/DC controller to determine a failure in the primary power source, and in response to determining the failure in the primary power source, provides a signal for switching a second switch that disables the power from the primary power source.

Aspects of the above include a system, wherein determining the failure in the primary power source is based on feedback from the intelligent voltage/current sensor and wherein the intelligent voltage/current sensor monitors power at a first vehicle battery and from the DC/DC controller.

Aspects of the above include a system, wherein the feedback from intelligent voltage/current sensor is based on at least one of an identified voltage, an identified amperage, and an identified temperature.

Aspects of the above include a system, wherein determining the failure in the primary power source is based on feedback from the DC/DC controller.

Aspects of the above include a system, wherein the feedback that the DC/DC controller has failed is based on the DC/DC controller failing and the first switch is locked to provide power from the primary power source.

Aspects of the above include a system, wherein determining the failure in the primary power source is based on feedback from the intelligent voltage/current sensor and the DC/DC controller.

Aspects of the above include a system further comprising: the intelligent voltage/current sensor; the DC/DC controller, wherein the DC/DC controller converts a high voltage from a first vehicle battery to a low voltage used in a voltage power network; a driver that switches the second switch; and a relay that further comprises the second switch.

Aspects of the above include a system, wherein the vehicle control unit receives power from a first low voltage power supply and wherein the DC/DC controller receives power from a second low voltage power supply.

Embodiments include a method for providing fail operational power comprising: receiving, by an electronic circuit, feedback from an intelligent voltage/current sensor and a DC/DC controller DC/DC controller, wherein the DC/DC controller comprises a first switch for controlling power from a primary power source; processing, by the electronic circuit, the feedback from the Intelligent voltage/current sensor and/or the DC/DC controller to determine a failure in the primary power source; and in response to determining the failure in the primary power source, providing, by the electronic circuit, a signal for switching a second switch that disables power from the primary power source.

Aspects of the above include a method, wherein determining the failure in the primary power source is based on feedback from the intelligent voltage/current sensor and wherein the intelligent voltage/current sensor monitors power at a first vehicle battery and from the DC/DC controller.

Aspects of the above include a method, wherein the feedback from intelligent voltage/current sensor is based on at least one of an identified voltage, an identified amperage, and an identified temperature.

Aspects of the above include a method, wherein determining the failure in the primary power source is based on feedback from the DC/DC controller.

Aspects of the above include a method, wherein the feedback that the DC/DC controller has failed is based on the primary switch control failing and the first switch is locked to provide power from the primary power source.

Aspects of the above include a method, wherein determining the failure in the primary power source is based on feedback from the intelligent voltage/current sensor and the DC/DC controller.

Embodiments include a system for providing failover comprising: a DC/DC controller that receives feedback from an intelligent voltage/current sensor, wherein the DC/DC controller controls a first switch for controlling power from a primary power source, wherein the intelligent voltage/current sensor monitors power at a first vehicle battery and the primary power source, and determines a failure in a primary power source based on the feedback from the intelligent voltage/current sensor, and in response to determining the failure in the primary power source, provides a signal for switching a second switch that disables the power from the primary power source.

Aspects of the above include a system, wherein the feedback from intelligent voltage/current sensor is based on at least one of an identified voltage, an identified amperage, and an identified temperature.

Aspects of the above include a system, wherein the first switch and the second switch are back-to-back switches.

Embodiments include a system for providing fail operational power comprising: a DC/DC controller that controls power from a primary power source, wherein the DC/DC controller comprises a first switch for controlling power from the primary power source; and an intelligent voltage/current sensor that monitors power at a first vehicle battery and from the primary power source, determines that the primary power source has failed, and in response to determining that the primary power source has failed, provides a signal for switching a second switch that disables the power from the primary power source.

Aspects of the above include a system, wherein the failure of the primary power source is based on at least one of an identified voltage, an identified amperage, and an identified temperature.

Aspects of the above include a system, wherein the first switch and the second switch are back-to-back switches.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric automated vehicle" (EV), also referred to herein as an electric drive automated vehicle, may use one or more electric motors or traction motors for propulsion. An electric automated vehicle may be powered through a collector system by electricity from off-automated vehicle sources, or may be self-contained with a battery or generator to convert fuel to electricity. An electric automated vehicle generally includes a rechargeable electricity storage system (RESS) (also called Full Electric Automated vehicles (FEV)). Power storage methods may include: chemical energy stored on the automated vehicle in on-board batteries (e.g., battery electric automated vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric automated vehicle" refers to an automated vehicle that may combine a conventional (usually fossil fuel-powered) powertrain with some form of electric propulsion. Most hybrid electric automated vehicles combine a conventional internal combustion engine (ICE) propulsion system with an electric propulsion system (hybrid automated vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is an automated vehicle that can run on just the engine, just the batteries, or a combination of both. A mid hybrid is an automated vehicle that cannot be driven solely on its electric motor, because the electric motor does not have enough power to propel the automated vehicle on its own.

The term "rechargeable electric automated vehicle" or "REV" refers to an automated vehicle with on board rechargeable energy storage, including electric automated vehicles and hybrid electric automated vehicles.

What is claimed is:

1. A system for providing fail operational power comprising:
    a high voltage vehicle battery pack;
    a DC/DC controller, wherein the DC/DC controller comprises a DC/DC converter and a first switch configured to disable power from the high voltage vehicle battery pack to a low voltage power network when the first switch is open, wherein the high voltage vehicle battery pack and the DC/DC controller comprise a primary power source;
    a second switch configured to disable power front the high voltage vehicle battery pack to the low voltage power network when the second switch is open;
    an intelligent voltage/current sensor with a first feedback path to the DC/DC controller for controlling the first switch, and a second feedback path for controlling the second switch, wherein:
        the DC/DC controller configured to receive feedback from the intelligent voltage/current sensor via the first feedback path for opening the first switch in response to the intelligent voltage/current sensor detecting a failure in the primary power source; and
        the intelligent voltage/current sensor configured to send a signal via the second feedback path to open the second switch in case of a fault in opening the first switch; and
    a secondary power source including a low voltage vehicle battery pack, the secondary power source configured to supply power to the low voltage power network via a power path in response to the intelligent voltage/current sensor detecting the failure in the primary power source.

2. The system of claim 1, wherein the detected failure is based on at least one of an identified voltage, an identified amperage, and an identified temperature.

3. The system of claim 1, wherein detecting the failure in the primary power source is further based on additional feedback from the DC/DC controller.

4. The system of claim 3, wherein the additional feedback from the DC/DC controller comprises determining the DC/DC controller has failed and the first switch is locked to provide the power from the high voltage vehicle battery pack.

5. The system of claim 1, wherein the DC/DC converter converts a high voltage from the high voltage vehicle battery pack to a low voltage used in the low voltage power network.

6. The system of claim 1, wherein the DC/DC controller receives the power from the secondary power source.

7. The system of claim 1, wherein the first switch and the second switch are back-to-back switches.

8. The system of claim 1, wherein the signal for switching the second switch that disables the power from the primary power source switches the second switch off.

9. The system of claim 1, wherein the low voltage power network redundantly powers the DC/DC controller via a low voltage supply path.

10. A method for providing fail operational power comprising:
controlling, by a DC/DC controller a first switch configured to disable power from a high voltage vehicle battery pack to a low voltage power network when the first switch is open, wherein the DC/DC controller includes a DC/DC converter, and wherein the high voltage vehicle battery pack and the DC/DC controller comprise a primary power source, wherein the DC/DC controller receives information from an intelligent voltage/current sensor via a first feedback path;
controlling, by the intelligent voltage/current sensor, via a second feedback path a second switch coupled to the DC/DC controller, the second switch configured to disable power from the high voltage vehicle battery pack to the low voltage power network when the second switch is open;
the DC/DC controller receiving feedback front the intelligent voltage/current sensor via the first feedback path to open the fir switch in response to the intelligent voltage/current sensor detecting a failure in the primary power source; and
the intelligent voltage/current sensor configured to send a signal via the second feedback path to open the second switch in case of a fault in opening the first switch; and
a secondary power source supplying power to the low voltage power network via a power path in response to the intelligent voltage/current sensor detecting the failure in the primary power source.

11. The method of claim 10, wherein detecting the failure in the primary power source is based on at least one of an identified voltage, an identified amperage, and an identified temperature.

12. The method of claim 10, wherein detecting the failure in the primary power source is further based on additional feedback from the DC/DC controller.

13. The method of claim 12, wherein the additional feedback from the DC/DC controller comprises determining the DC/DC controller has failed and the first switch is locked to provide the power from the primary power source.

14. The method of claim 10, wherein the low voltage power network redundantly powers the DC/DC controller via a low voltage supply path.

15. A system for providing failover comprising:
a DC/DC controller controls a first switch to disable power from a high voltage vehicle battery pack to a low voltage power network when the first switch is open, and wherein the high voltage vehicle battery pack and the DC/DC controller comprise a primary power source;
a second switch coupled to the DC/DC controller, the second switch disables power from the high voltage vehicle battery pack to the low voltage power network when the second switch is open;
the DC/DC controller receives a signal from an intelligent voltage/current sensor via a first feedback path for opening the first switch in response to the intelligent voltage/current sensor detecting a failure in the primary power source;
the intelligent voltage/current sensor sends a signal via a second feedback path to open the second switch in case of a fault in opening the first switch; and
a secondary power source including a low voltage vehicle battery pack supplies power to the low voltage power network via a power path in response to the intelligent voltage/current sensor detecting the failure in the primary power source.

16. The system of claim 15, wherein the detected failure is based on at least one of an identified voltage, an identified amperage, and an identified temperature.

17. The system of claim 15, wherein the first switch and the second switch are back-to-back switches.

18. The system of claim 15, wherein the DC/DC controller comprises a DC/DC converter that converts a high voltage from the high voltage vehicle battery pack to the low voltage used in a low voltage power network.

19. The system of claim 15, wherein the DC/DC controller receives power from the secondary power source.

20. The system of claim 15, wherein the low voltage power network redundantly powers the DC/DC controller via a low voltage supply path.

* * * * *